US009236774B2

(12) United States Patent
Shiraishi et al.

(10) Patent No.: US 9,236,774 B2
(45) Date of Patent: Jan. 12, 2016

(54) STATOR-FIXED STRUCTURE AND DRIVING UNIT

(75) Inventors: Tomonari Shiraishi, Shizuoka (JP);
Toshihiko Nagata, Shizuoka (JP);
Toshihide Ootani, Shizuoka (JP);
Hideyuki Kobayashi, Shizuoka (JP)

(73) Assignee: YAMAHA MOTOR ELECTRONICS CO., LTD., Shizuoka (JP)

( * ) Notice: Subject to any disclaimer, the term of this patent is extended or adjusted under 35 U.S.C. 154(b) by 226 days.

(21) Appl. No.: 14/003,291

(22) PCT Filed: Feb. 21, 2012

(86) PCT No.: PCT/JP2012/001154
§ 371 (c)(1),
(2), (4) Date: Sep. 5, 2013

(87) PCT Pub. No.: WO2012/120801
PCT Pub. Date: Sep. 13, 2012

(65) Prior Publication Data
US 2013/0341112 A1    Dec. 26, 2013

(30) Foreign Application Priority Data
Mar. 9, 2011   (JP) .................. 2011-051685

(51) Int. Cl.
*B62M 6/55*    (2010.01)
*H02K 1/18*    (2006.01)
(Continued)

(52) U.S. Cl.
CPC .............. *H02K 1/185* (2013.01); *B60L 11/007* (2013.01); *B62M 6/55* (2013.01); *H02K 15/16* (2013.01); *B60L 2200/12* (2013.01); *Y02T 10/641* (2013.01)

(58) Field of Classification Search
CPC ...... H02K 1/185; H02K 15/16; B60L 11/007; B62M 6/55
USPC .................................................. 310/422, 423
See application file for complete search history.

(56) References Cited

U.S. PATENT DOCUMENTS 2,154,146 A * 4/1939 Becker .......................... 310/431
5,315,200 A * 5/1994 Lemieux et al. ........ 310/216.124
(Continued)

FOREIGN PATENT DOCUMENTS

CN    1249881 A    4/2000
JP    57-186937 A    11/1982
(Continued)

OTHER PUBLICATIONS

Official Communication issued in International Patent Application No. PCT/JP2012/001154, mailed on Apr. 17, 2012.

Primary Examiner — Terrance Kenerly
(74) Attorney, Agent, or Firm — Keating and Bennett, LLP

(57) ABSTRACT

A driving unit includes a stator, a housing including a tubular section to accommodate the stator, a cover coupled to the housing to block an upper opening of the tubular section, and a bent wire rod defined by a wire to press the stator against the tubular section, the bent wire rod being arranged between a top surface of the stator and a rear surface of the cover while being compressingly deformed along an axis of the stator. The bent wire rod has substantially annular shape with an opened portion when seen along the axis, and includes projections projecting upward along the axis and depressions projecting downward along the axis being arranged alternately and successively. An elastic force from the bent wire rod causes the stator to receive a downward force along the axis. The stator is pressed against the tubular section to hold the stator in the housing.

12 Claims, 13 Drawing Sheets

(51) Int. Cl.
*H02K 15/16* (2006.01)
*B60L 11/00* (2006.01)

(56) References Cited

U.S. PATENT DOCUMENTS

2002/0031181 A1 3/2002 Doux
2002/0046891 A1* 4/2002 Honda et al. .................. 180/220

2009/0289522 A1* 11/2009 Buban .................... 310/216.113

FOREIGN PATENT DOCUMENTS

| JP | 03-26250 U | 3/1991 |
| JP | 05-137290 A | 6/1993 |
| JP | 06-70523 A | 3/1994 |
| JP | 2004-48925 A | 2/2004 |

* cited by examiner

STATOR-FIXED STRUCTURE AND DRIVING UNIT

BACKGROUND OF THE INVENTION

1. Field of the Invention

The present invention relates to a stator-fixed structure and a driving unit. More particularly, the present invention is directed to techniques of fixing a stator to a housing.

2. Description of the Related Art

Conventionally, a motor or a generator has been known including a stator, a rotor in the interior of the stator, and a case accommodating the stator and the rotor. The stator is fixed to the case by bolts or screws. See, for example, Japanese Patent Publication No. H06-70523A. Otherwise, the stator is adhered to the case via an adhesive. Such has also been known.

Examples of the conventional art with the construction described above, however, have the following drawbacks. That is, fixing the stator to the case by bolts or the like takes much time for assembly since the bolts require fastening upon fixing the stator. Such an inconvenience may occur. Moreover, portions for fixing the stator by bolts or the like are required, and thus such portions may lead to another inconvenience of a complex construction. On the other hand, fixing the station with an adhesive may lead to an inconvenience of increased time for assembly including a cure time for the adhesive. Moreover, working efficiency easily decreases due to adhesion of the adhesive to a hand or the like of an operator. Such an inconvenience may also occur.

SUMMARY OF THE INVENTION

In view of the state of the art described above, a preferred embodiment of the present invention provides a stator-fixed structure and a driving unit with a simple construction that allows the stator to be fixed in a short period of time.

A preferred embodiment of the present invention discloses a stator-fixed structure. The stator-fixed structure includes a stator, a housing including a tubular section to accommodate the stator, a cover coupled to the housing to block an upper opening of the tubular section, and a bent wire rod defined by a wire to press the stator against the tubular section, the bent wire rod being arranged between a top surface of the stator and a rear surface of the cover while being compressingly deformed along an axis of the stator. The bent wire rod has an annular or substantially annular shape with an opened portion when seen along the axis, and includes projections projecting upward along the axis and depressions projecting downward along the axis arranged alternately and successively, the projections contacting the rear surface of the cover and the depressions contacting the top surface of the stator.

The bent wire rod is defined by a wire, and has an annular or substantially annular shape with an opened portion when seen along the axis. Examples of the substantially annular shape include a shape defined by only curves such as a circle or an ellipse, a shape defined by straight lines such as a polygon, and a shape defined by straight lines and curves.

The bent wire rod includes alternate projections and depressions arranged successively, the projections projecting upward along the axis and the depressions projecting downward along the axis. In a preferred embodiment of the present invention, it is assumed that a direction along the axis of the stator from the stator toward the cover is an upward direction and a direction opposite thereto is a downward direction. Accordingly, when seen around the axis, the bent wire rod preferably has a zigzag or a wavy shape with the alternate projections and depressions arranged successively along the axis. Connections between the projections and depressions may be linear or curved.

When such a bent wire rod is provided between the stator and the cover, the projections contact the rear surface of the cover and the depressions contact the top surface of the stator. In addition, the bent wire rod is compressingly deformed along the axis. Accordingly, the bent wire rod generates an elastic force extending along the axis. The elastic force causes the stator to undergo a downward force along the axis. Then the stator is pressed against the tubular section so as to be held in the housing. This suitably prevents or reduces shifting of the stator along the axis.

The elastic and deformable bent wire rod absorbs variations in the dimension of the stator or the cover along the axis, and thus suitably presses the stator against the tubular section.

The stator-fixed structure described above does not use bolts or the like to fix the stator thus achieving a simple construction. In addition, the stator is fixed to the housing by merely providing the bent wire rod between the stator and the cover resulting in an enhanced working efficiency. The location of the stator is fixed in a short period of time.

One of the directions along the axis is defined as an upward direction and the other direction as a downward direction. The direction along the axis, however, is not limited to a specific direction, such as a vertical direction. That is, the stator may be disposed in any direction and attitude, and accordingly the axis may extend in any direction.

In a preferred embodiment of the present invention, it is preferable that the bent wire rod includes a plurality of corners and a plurality of straight portions so as to define a substantially polygonal shape when seen along the axis, the straight portions connecting adjacent corners to each other. The bent wire rod preferably has a polygonal or substantially polygonal outer shape when seen along the axis. The corner where the wire rod is bent corresponds to a vertex of the polygonal or substantially polygonal shape. The straight portion where the wire rod extends linearly or substantially linearly corresponds to a side of the polygonal or substantially polygonal shape. The bent wire rod with straight portions is made with more ease than an outer shape with only curves.

In a preferred embodiment of the present invention, the corners are preferably arranged at the projections or the depressions. For instance, when the corners are located at the same positions as the projections, the wire rod is bent at one of the projections in a direction where bending following the projections and bending following the corners are combined. When the corners are located at the same positions as the depressions, the wire rod is bent at one of the depressions in a direction where bending following the depressions and bending following the corners are combined. Every corner is provided with a projection or a depression, and thus the corners serve as the projections or the depressions. The number of bent portions of the wire rod is independent of the number of corners, and thus the total number of the bent portions is defined by the total number of the projections and depressions. Consequently, making the bent wire rod is facilitated.

In a preferred embodiment of the present invention, the projections and the depressions are preferably bent such that the bent wire rod has a polygonal or substantially polygonal outer shape with the projections and the depressions defining vertices when seen along the axis. In addition, the bent wire rod preferably includes straight portions connecting adjacent projections and depressions. The projections and depressions are bent so as to project along the axis and to be a vertex of the polygonal or substantially polygonal shape when seen along the axis. As a result, the bent wire rod has essentially a uniform shape regardless of whether it is upside-down. For instance, a portion projecting in one direction along the axis may serve as a projection or a depression. This reduces the work load of assembling the bent wire rod.

In a preferred embodiment of the present invention, it is preferable that the bent wire rod is shaped to have a dimension larger than the external diameter of the stator when seen along the axis, and is preferably assembled while being deformed so as to have a smaller outer shape. The bent wire rod is partially open when seen along the axis. Consequently, the bent wire rod is deformable radially and inwardly relative to the axis so as to have a smaller outer shape. In addition, the bent wire rod has a polygonal or substantially polygonal shape larger than the external diameter of the stator when seen along the axis. Accordingly, when the bent wire rod is assembled while being deformed so as to have a smaller outer shape, the bent wire rod contacts a peripheral edge of the stator.

In a preferred embodiment of the present invention, the bent wire rod is preferably defined by a wire rod having a circular cross-section. The wire rod having the circular cross-section can be bent in any direction. Consequently, making the bent wire rod can be facilitated.

In a preferred embodiment of the present invention, the cover preferably includes a side wall and a protrusion. The side wall is provided on a rear surface of the cover in a peripheral direction about the axis, and contacts the bent wire rod to receive an elastic force radially and outwardly relative to the axis that is generated by the bent wire rod. The protrusion projects from the side wall radially and inwardly relative to the axis to contact the projection and to receive an upward elastic force along the axis that is generated by the bent wire rod. Accordingly, the radial and outward elastic force of the bent wire rod expands the bent wire rod along the periphery of the side wall, and thus the bent wire rod itself rests on the side wall. This facilitates resting of the bent wire rod on the cover. In addition, the protrusion receiving the upward elastic force along the axis projects from the side wall, such that the bent wire rod is deformed compressingly while resting on the side wall. Consequently, coupling of the cover to the housing permits the bent wire rod to be compressingly deformed in a given position in one operation. As described above, the stator is fixed to the housing with high efficiency.

In a preferred embodiment of the present invention, the side wall preferably has an internal diameter slightly larger than an external diameter of the stator. This allows an upper portion of the stator to be accommodated partially inside the side wall. As described above, partial accommodation of the stator inside the cover facilitates a size reduction.

In a preferred embodiment of the present invention, the protrusion is preferably inclined downwardly along the axis and radially toward the axis. A recess into which the projections are held is preferably provided between the protrusion and the side wall. The protrusion pressed by the bent wire rod upwardly along the axis is inclined downwardly and radially toward the axis. Such a protrusion prevents or reduces shifting of the bent wire rod (projection) radially inward. That is, a contact position of the bent wire rod with the cover suitably prevents or reduces radial shifting of the bent wire rod.

In a preferred embodiment of the present invention, the stator preferably includes a stator core and coils formed by winding the stator core with a winding. The bent wire rod preferably contacts a top surface of the stator core directly. The stator core preferably has a rigidity higher than that of the coil. The bent wire rod directly contacts the stator core having a relatively higher rigidity to achieve accurate pressing of the stator.

In a preferred embodiment of the present invention, the stator preferably further includes a restricting element disposed on the top surface of the stator core and inside from an outer peripheral edge of the stator core to restrict shifting of the bent wire rod radially inward. The restricting element suitably prevents or reduces radial shifting of the contact position of the bent wire rod with the stator. In other words, shifting of the depressions of the bent wire rod is suitably prevented or reduced.

In a preferred embodiment of the present invention, the stator preferably includes an insulated bobbin disposed between the stator core and the coils to cover the stator core. The restricting element is preferably integrated with the insulated bobbin. The insulated bobbin serves as the restricting element resulting in a simplified structure.

Another preferred embodiment of the present invention includes a driving unit. The driving unit includes a motor configured to generate power, the motor including a rotor and a stator outside of the rotor, a housing including a tubular section accommodating the motor, a cover coupled to the housing to block an upper opening of the tubular section, and a bent wire rod defined by a wire rod, the bent wire rod being disposed between a top surface of the stator and a rear surface of the cover while being compressingly deformed along an axis of the stator to press the stator against the tubular section. The bent wire rod is annular or substantially annular and includes an opened portion when seen along the axis, and includes projections projecting upward along the axis and depressions projecting downward along the axis arranged alternately and successively, the projections contacting the rear surface of the cover and the depressions contacting the top surface of the stator.

The driving unit according to a preferred embodiment of the present invention including the stator-fixed structure described above. Consequently, variations in the dimensions of the stator or the cover along the axis are absorbed to suitably prevent or reduce shifting of the stator along the axis. In addition, the construction of the driving unit is compact. Moreover, the stator is fixed to the housing by merely arranging the bent wire rod between the stator and the cover, resulting in an enhanced working efficiency and assembly in a short period of time. Accordingly, efficient assembly of the driving unit can be achieved.

In a preferred embodiment of the present invention, the driving unit is mountable on a bicycle. The housing further includes a crankshaft chamber into which a crankshaft of the bicycle is inserted. The motor generates power to assist pressure on the pedals coupled to the crankshaft. Such a construction is preferable. The pedals of the bicycle often first contact the ground. The crankshaft is coupled the pedals. Accordingly, in the driving unit mounted on the bicycle, a shock may be applied directly to the housing, and in addition, a shock may be applied directly inside the driving unit (crankshaft chamber) via the crankshaft. In the latter, a strong force is applied to the stator along the axis. On the other hand, the driving unit according to a preferred embodiment of the present invention includes the stator-fixed structure described above, and thus shifting or disconnection of the stator along the axis is suitably prevented or reduced. Consequently, the driving unit according to a preferred embodiment of the present invention is suitably applicable to bicycles, for example.

In the stator-fixed structure according to a preferred embodiment of the present invention, the projections of the bent wire rod contact the rear surface of the cover, and the depressions of the bent wire rod contact the top surface of the stator. Moreover, the bent wire rod is compressingly deformed along the axis. This causes the bent wire rod to generate an elastic force extending along the axis. The elastic force exerts an upward force along the axis to the cover and a downward force along the axis to the stator. Then the stator is pressed against the tubular section to be held in the housing. Consequently, shifting of the stator along the axis is suitably prevented or reduced.

In addition, the elastically deformable bent wire rod absorbs variations in the dimensions of the stator or the cover along the axis thus achieving suitable pressing of the stator against the tubular section.

The stator-fixed structure described above does not use bolts or the like to fix the location of the stator, thus achieving a simple construction. In addition, the stator is fixed to the housing by merely arranging the bent wire rod between the stator and the cover resulting in enhanced working efficiency. The location of the stator is fixed in a short period of time.

The driving unit according to a preferred embodiment of the present invention includes the stator-fixed structure. Consequently, variations in the dimensions of the stator or the cover along the axis are absorbed suitably preventing or reducing shifting of the stator along the axis of the stator. Moreover, this achieves a simple construction of the driving unit. Furthermore, the stator is fixed to the housing by merely providing the bent wire rod between the stator and the cover resulting in an enhanced working efficiency and assembly in a short period of time. Accordingly, efficient assembly of the driving unit can be achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Description will be given hereinafter of preferred embodiments of the present invention with reference to drawings. A driving unit mountable on a bicycle will be described as one example of a preferred embodiment of the present invention.

Figure 1:
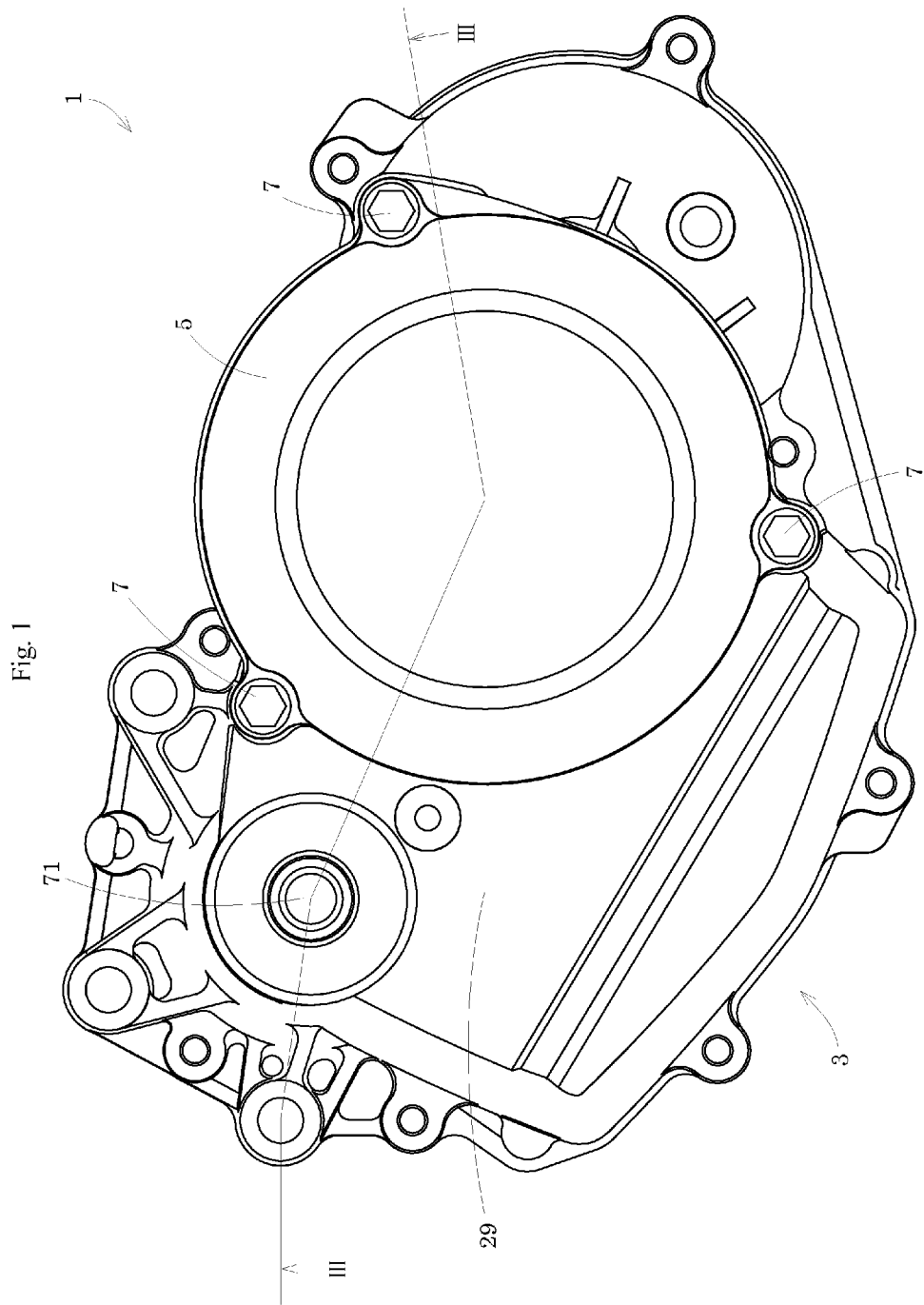
FIG. 1 is an external view of a driving unit according to a preferred embodiment of the present invention.

FIG. 1 is an external view of a driving unit according to a preferred embodiment of the present invention.

A driving unit 1 includes a housing 3 and a cover 5. The cover 5 is fastened to the housing 3 via bolts 7. A crankshaft 71 of a bicycle passes through the driving unit 1.

Figure 2:
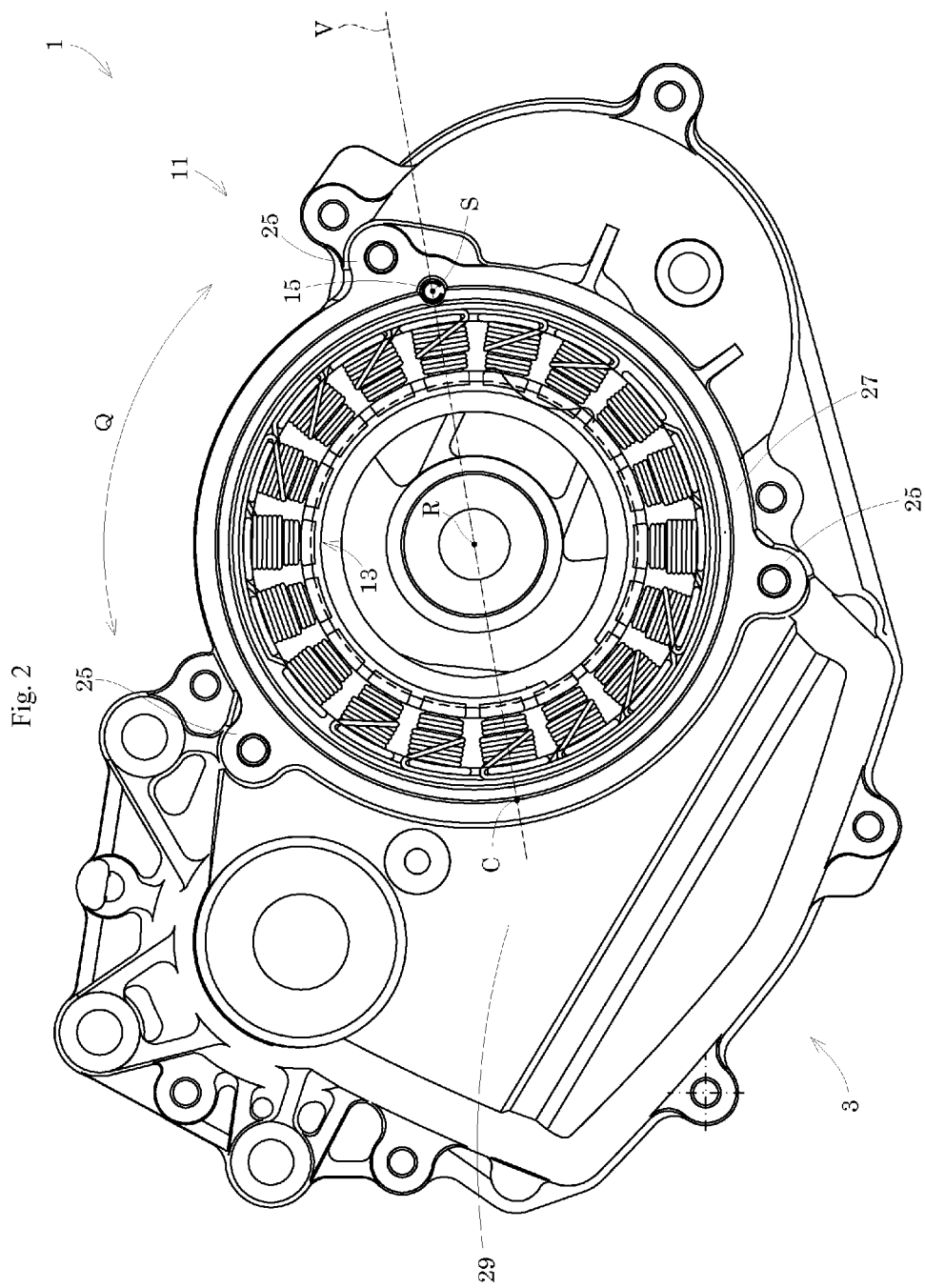
FIG. 2 is a plan view of a principal portion of the driving unit.

FIG. 2 is a plan view of a principal portion of the driving unit 1. In FIG. 2, besides the cover 5 and the crankshaft 71 described above, a rotor or the like is not shown. As illustrated, the housing 3 includes a tubular section 11 that is cylindrical or substantially cylindrical. The tubular section 11 accommodates a stator 13. A spring pin 15 is pressed into a gap between the tubular section 11 and the stator 13.

Figure 3:
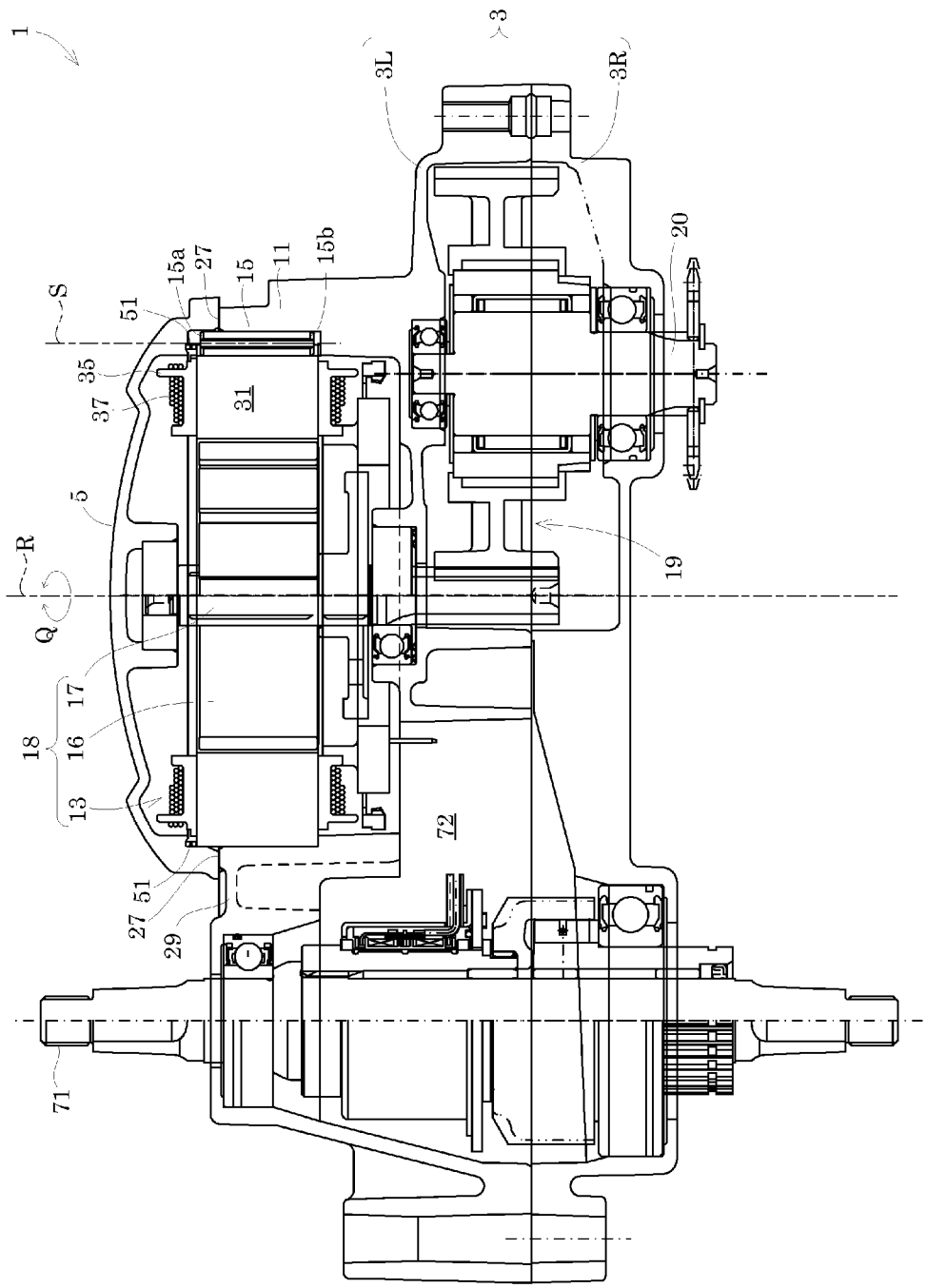
FIG. 3 is a sectional view along arrow III-III in FIG. 1.

FIG. 3 is a sectional view along arrow of III-III in FIG. 1. As illustrated, a rotor 16 is disposed inside of the stator 13. The rotor 16 is connected to a rotary shaft 17 so as to rotate integrally with the rotary shaft 17. The rotary shaft 17 is rotatably supported in the housing 3. The stator 13, the rotor 16, and the rotary shaft 17 define a motor 18 that generates power. The rotary shaft 17 is interlocked with an output shaft 20 via a gear unit 19 or the like. The output shaft 20 outputs power generated by the motor 18.

The cover 5 described above closes an upper opening of the tubular section 11. The cover 5 contacts an upper end surface 27 of the tubular section 11. A bent wire rod 51 is arranged between the cover 5 and the stator 13 while being compressingly deformed.

The housing 3 includes a left case 3L and a right case 3R in which the left and right cases are separable from each other. Description is made below simply of the housing 3 unless there is a difference between the left case 3L and the right case 3R.

In a preferred embodiment of the present invention, the term "axis R" is used throughout the specification assuming that the axis R of the stator 13 substantially conforms to the central axis of the tubular section 11 for convenience. In addition, in a preferred embodiment of the present invention, a direction along the axis of the stator 13 from the stator 13 toward the cover 5 is referred to as an "upward direction along the axis R" or "upward" for convenience. In addition, a direction opposite to the direction from the stator 13 toward the cover 5 is referred to as a "downward direction along the axis R" or "downward". For instance, an upper side of the plane of FIG. 3 is referred to as an "upside direction along the axis R" or simply as the "upside", whereas a lower side of the plane of the drawing is a "downside direction along the axis R" or simply the "downside", provided that this is not a limitation of a direction of the axis R to a specific direction such as a vertical direction. That is, the stator 13 may be disposed in any direction and attitude and, accordingly, the axis R may extend in any direction. A direction around the axis R is referred to as a "peripheral direction Q".

Figure 4:
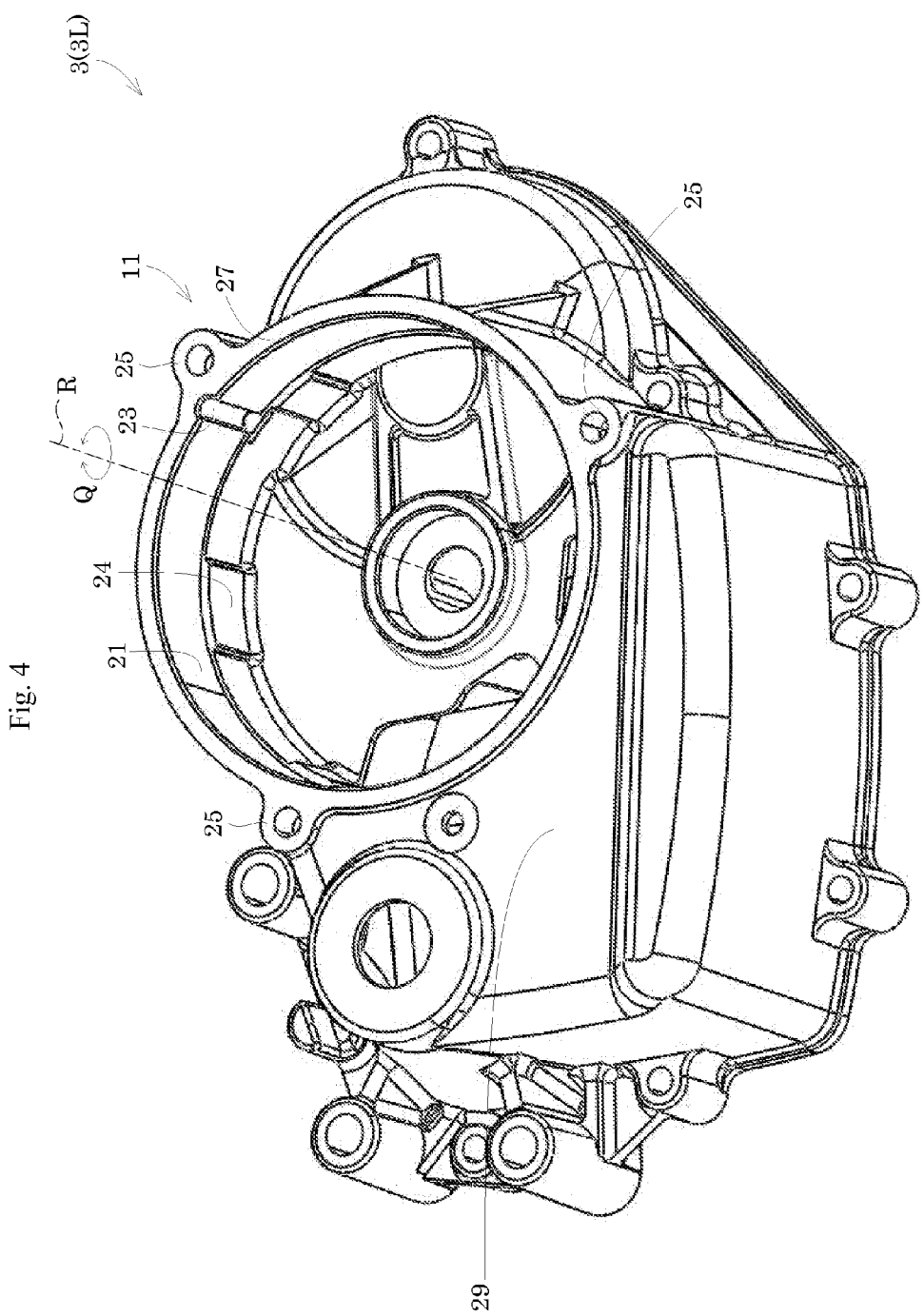
FIG. 4 is a perspective view of a principal portion of a housing.

FIG. 4 is a perspective view of a principal portion of the housing 3. In FIG. 4, only the left case 3L is illustrated and the right case 3R is omitted.

As illustrated, the tubular section 11 includes an inner wall 21 on the inside thereof. The inner wall 21 has an internal diameter slightly larger than an external diameter of the stator 13, thus allowing accommodation of the stator 13. The inner wall 21 includes a single first groove 23 therein. In FIG. 4, the first groove 23 is disposed in a position slightly different from that in FIG. 2.

On lower ends of the inner wall 21 and the first groove 23, a flange 24 is provided that projects inwardly and radially relative to the axis R (hereinafter abbreviated as "radially" where appropriate). The flange 24 has an internal diameter smaller than an external diameter of the stator 13. The flange 24 contacts the stator 13 at a top surface thereof to support the stator 13.

The tubular section 11 further includes a plurality of (e.g., three) bosses 25 for connecting the cover 5 to the housing 3. The housing 3 further includes a plate section 29 projecting externally from the outer wall of the tubular section 11. The plate section 29 serves as a wall defining a crankshaft chamber 72 into which the crankshaft 71 is inserted.

As illustrated in FIG. 3, the stator 13 includes a stator core 31, an insulated bobbin 35, and a coil 37. The insulated bobbin 35 covers the stator core 31. The coil 37 includes a winding wound around the stator core 31 over the insulated bobbin 35.

Figure 5:
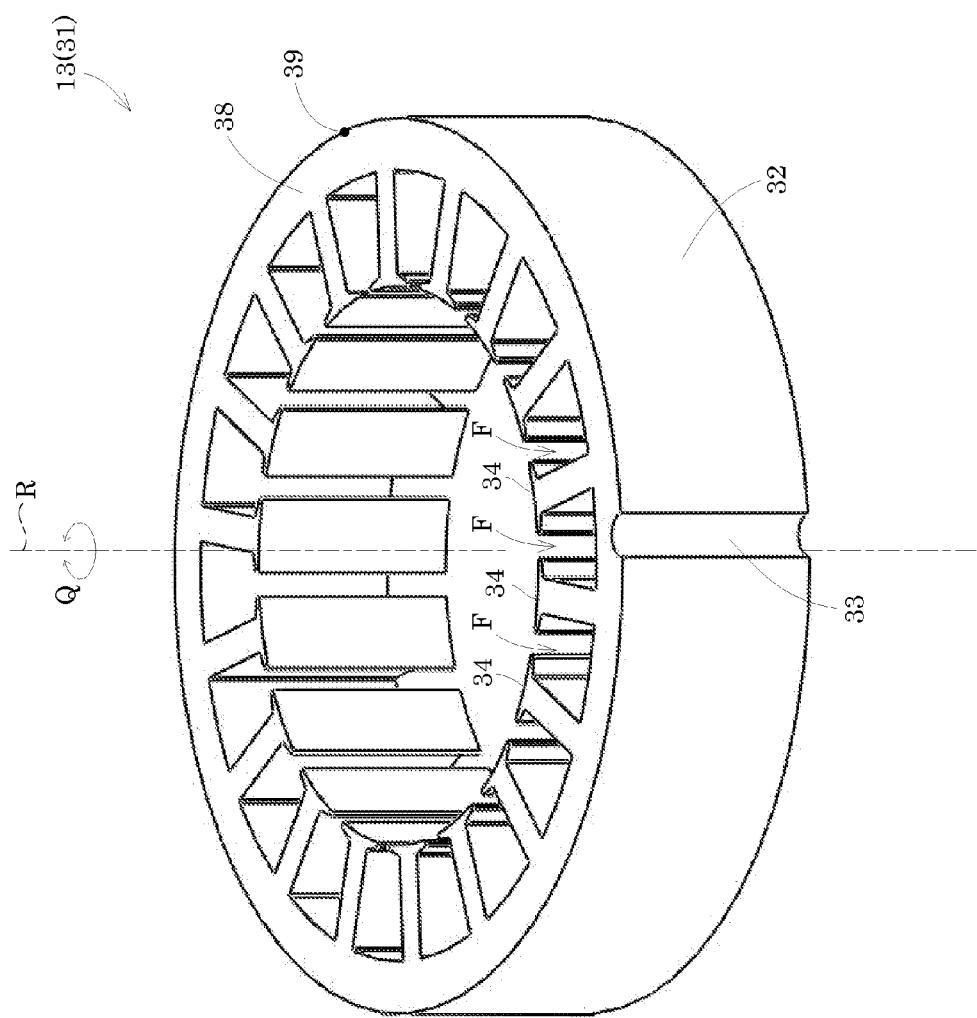
FIG. 5 is a perspective view of a principal portion of a stator.

FIG. 5 is a perspective view of a principal portion of the stator. As illustrated, a second groove 33 is provided on an outer wall 32 of the stator core 31, the second groove 33 being parallel or substantially parallel to the axis R. The second groove 33 has a semicircular or substantially semicircular shape. The stator core 31 further includes a plurality of teeth 34. A slot F is arranged between adjacent teeth 34. The second groove 33 is disposed radially outside of the slot F.

Figure 6:
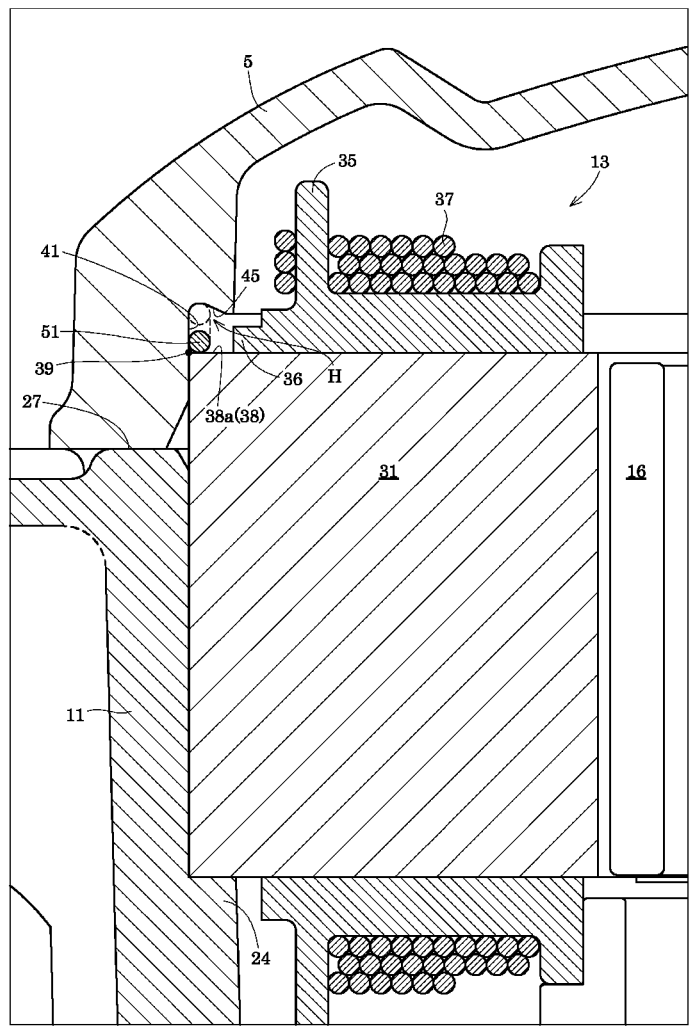
FIGS. 6 and 7 are enlarged sectional views each illustrating a stator-fixed structure.
Figure 7:
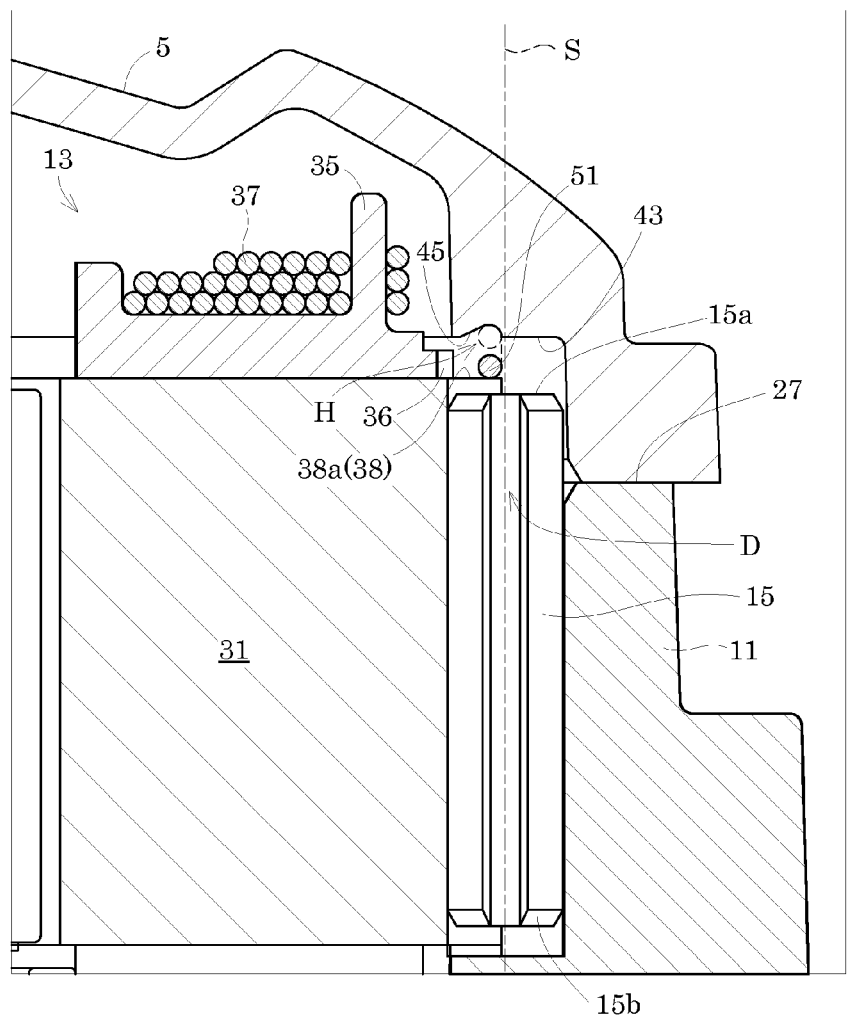

FIGS. 6 and 7 are each enlarged sectional views of the stator-fixed structure. As illustrated, the insulated bobbin 35 includes a collar 36 extending radially and outwardly to cover the top surface of the stator core 31. The collar 36 has a diameter slightly smaller than the external diameter of the stator core 31. Accordingly, a peripheral edge 38a of the top surface 38 of the stator core 31 is exposed.

Figure 8:
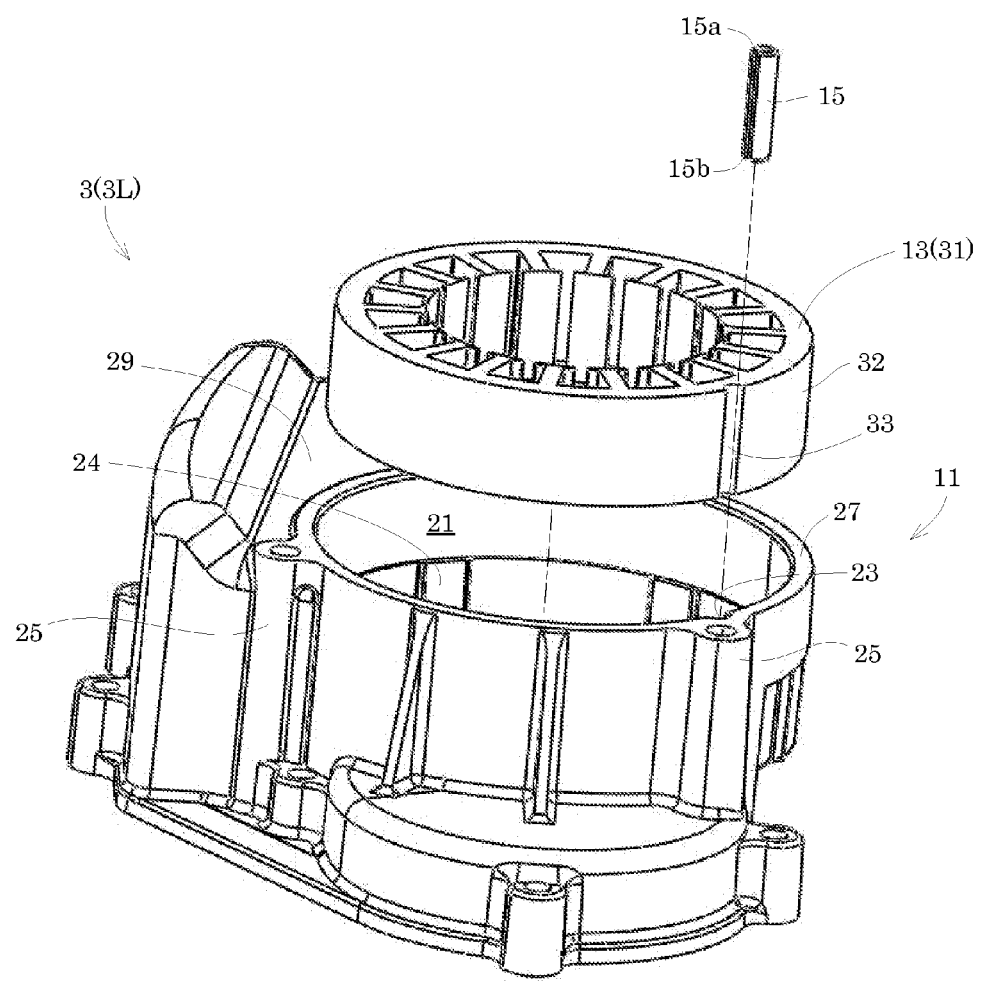
FIG. 8 is an exploded perspective view of a principal portion of the driving unit.

FIG. 8 is an exploded perspective view of a principal portion of the driving unit 1. As illustrated, the stator 13 is attached to the tubular section 11 such that the second groove 33 opposes the first groove 23. This creates a circular or substantially circular gap defined by the first groove 23 and the second groove 33.

Figure 9:
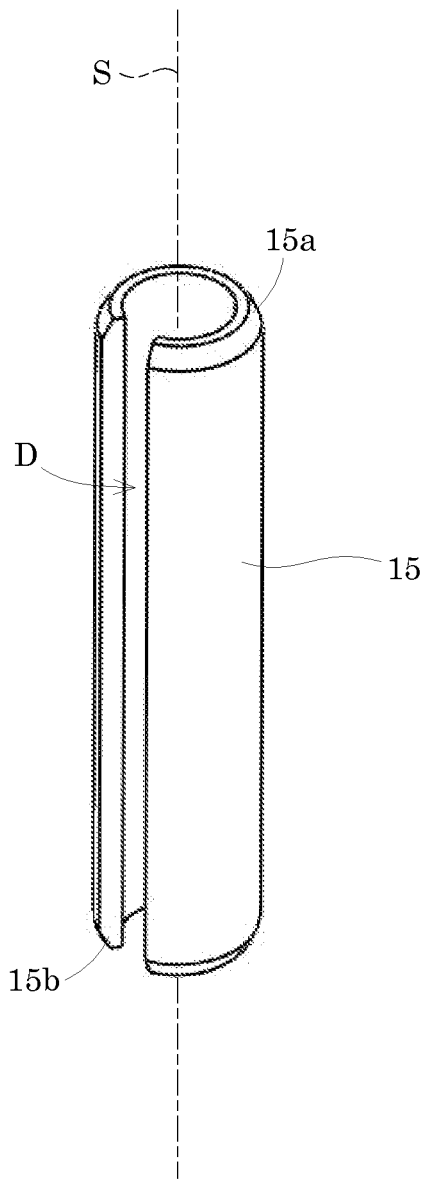
FIG. 9 is an external perspective view of a spring pin.

FIG. 9 is an external perspective view of the spring pin 15. As illustrated, the spring pin 15 has a cylindrical or substantially cylindrical shape, and includes a slit D parallel or substantially parallel to a shaft axis S. An upper end 15a and a lower end 15b of the spring pin 15 are preferably chamfered. The ends are each preferably tapered. When the spring pin 15 is compressingly deformed radially and inwardly toward the shaft axis S, the spring pin 15 exerts a elastic force radially and outwardly relative to the shaft axis S.

As illustrated in FIG. 7, the spring pin 15 is pressed into the gap defined by the first groove 23 and the second groove 33.

As illustrated in FIG. 2, when the spring pin 15 is pressed into the gap it is kept compressingly deformed, thus exerting an elastic force. The elastic force causes the spring pin 15 to press against a portion of the stator 13 (stator core 31) thus pressing the opposite portion of the stator 13 against the inner wall 21 of the tubular section 11. Specifically, assuming that a direction from the shaft axis S of the spring pin 15 toward the axis R is a radial direction V and an intersecting point of the radial direction V and the inner wall 21 is a point C, the stator 13 comes into surface contact with the inner wall 21 within an area extending around the point C in the peripheral direction Q of the axis R.

The inner wall 21 in surface contact with the stator 13 undergoes a load radially and outwardly relative to the axis R. This causes a friction force between the stator 13 and the inner wall 21. The friction force holds the stator 13. That is, shifting of the stator 13 along the axis R is suitably prevented or reduced.

Figure 10:
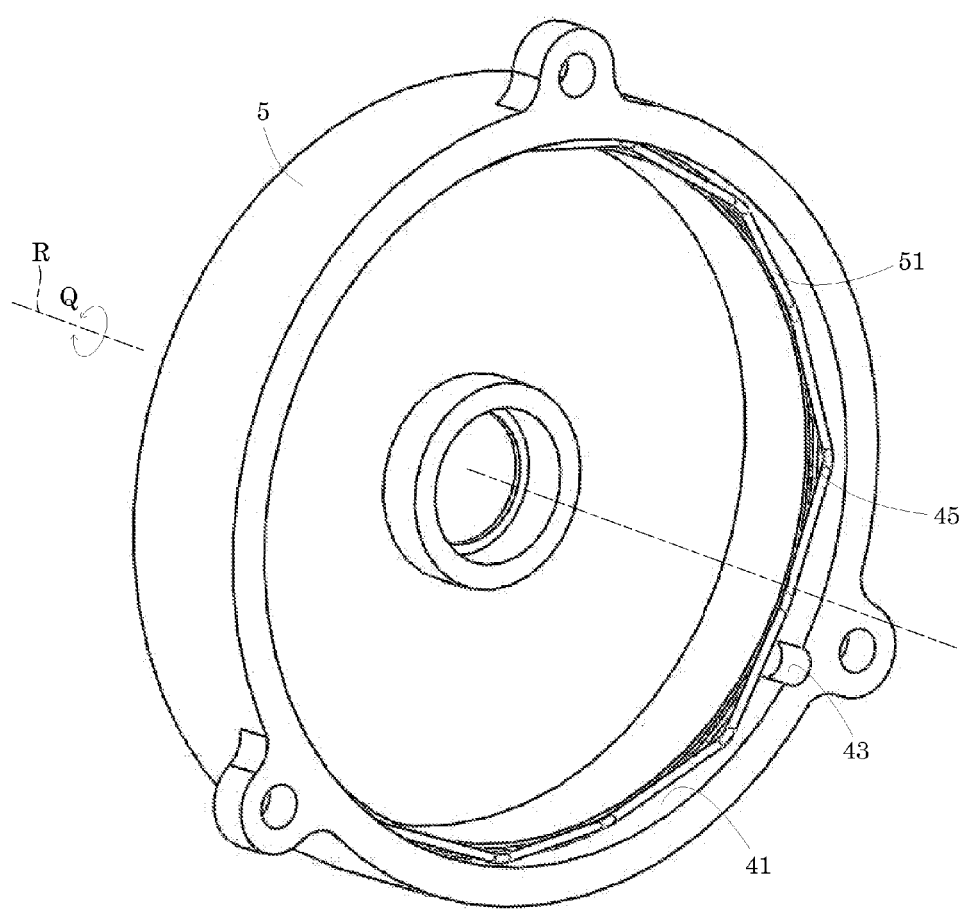
FIG. 10 is a perspective view of a rear surface of a cover.

Reference is made to FIGS. 6, 7, and 10. FIG. 10 is a perspective view of the rear surface of the cover 5. The rear surface of the cover 5 includes a side wall 41 therein. The side wall 41 is located along the peripheral direction Q of the axis R. The side wall 41 has an internal diameter slightly larger than the external diameter of the stator 13. The stator 13 (stator core 31) projecting from the tubular section 11 is accommodated inside the side wall 41. As described above, the upper side of the stator 13 is partially accommodated in the cover 5 facilitating a reduction in the size of the driving unit 1.

The side wall 41 includes a notch 43 therein. The notch is disposed along an extended position of the first groove 23. As illustrated in FIG. 7, the spring pin 15 is accommodated in the notch 43, the spring pin 15 projecting upward from the upper end surface 27 of the tubular section 11. The spring pin 15 preferably has a length smaller than the dimension of the stator 13 along the axis R. Consequently, the spring pin 15 does not project upward over the stator 13 (stator core 31).

The cover 5 also includes a protrusion 45. The protrusion 45 projects radially and inwardly from an upper end of the side wall 41. The protrusion 45 is inclined downwardly along the axis R and radially toward the axis R. As a result, an annular recess (space) H is provided between the side wall 41 and the protrusion 45.

Figure 11:
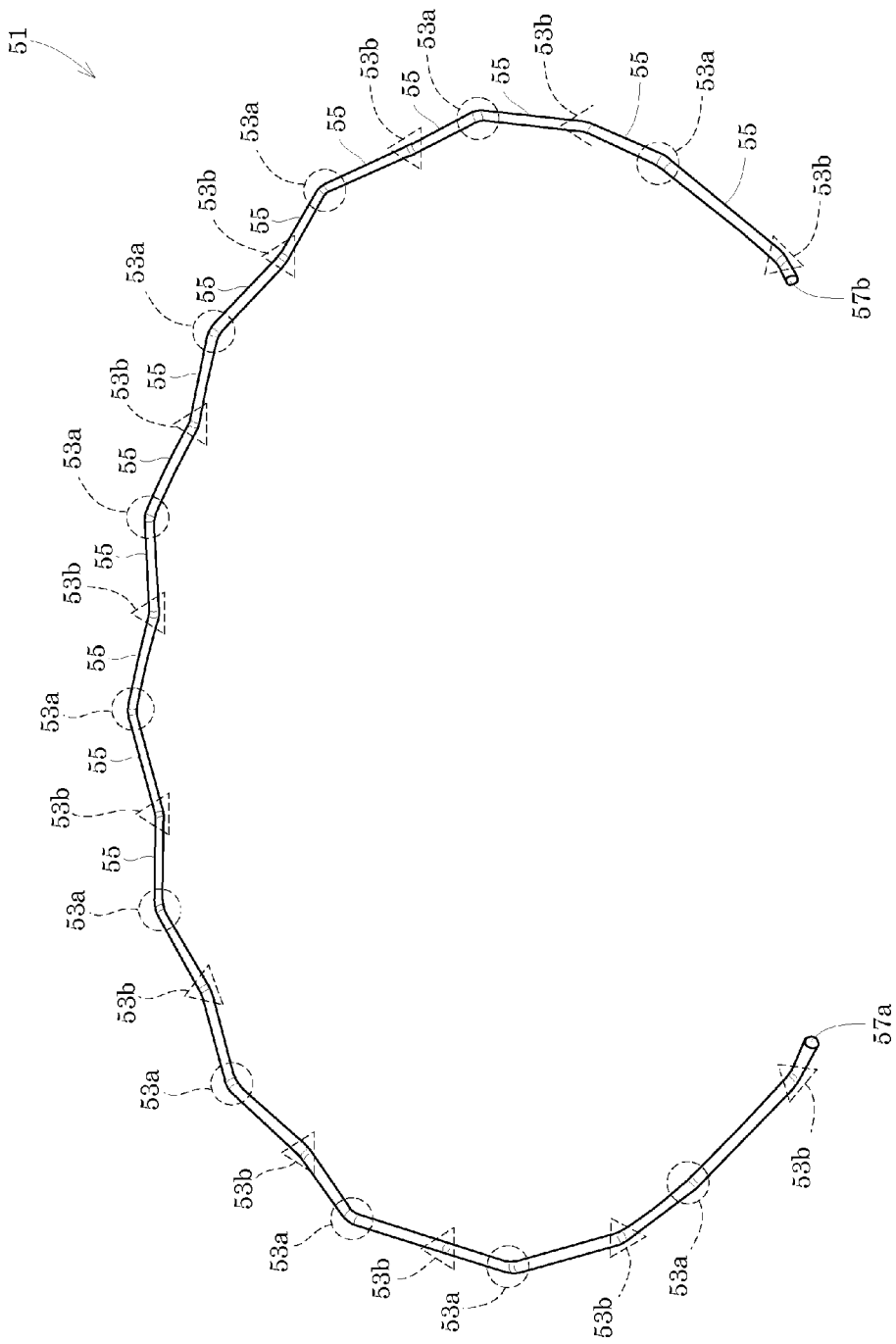
FIG. 11 is a perspective view of a bent wire rod.
Figure 12A:
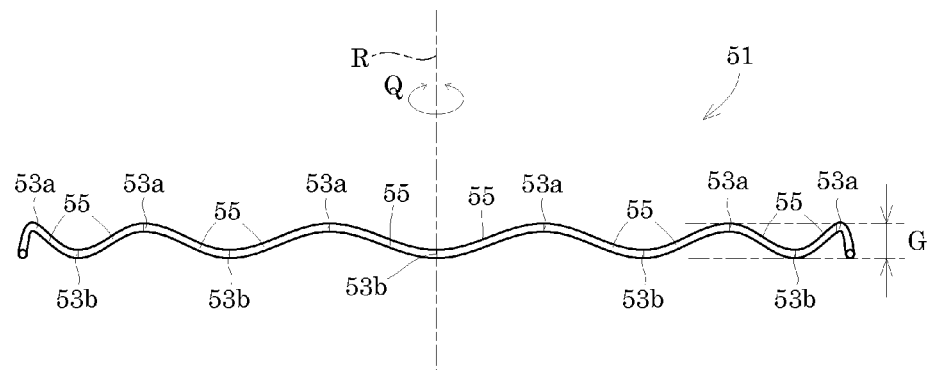
FIG. 12A is a view of the bent wire rod illustrating a partial side view of the bent wire rod as seen from a direction orthogonal to the axis of the stator.
Figure 12B:
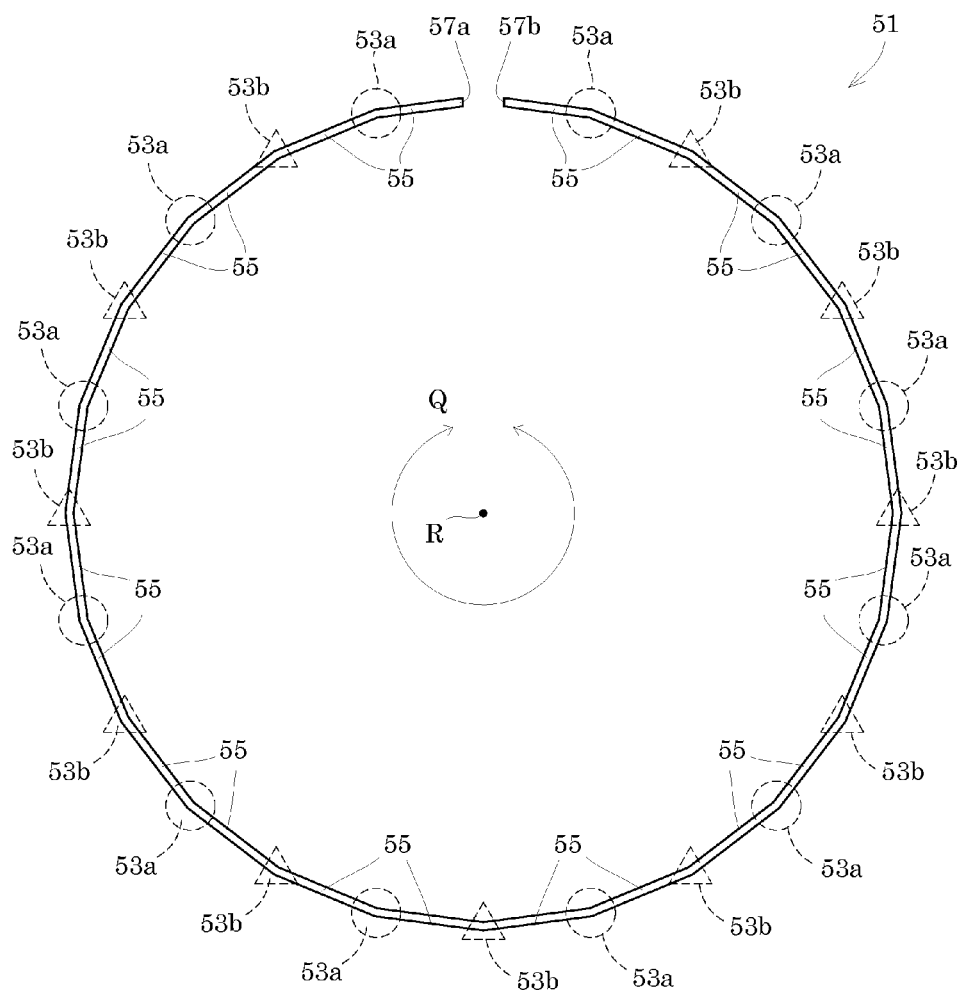
FIG. 12B is a view of the bent wire rod illustrating a plan view of the bent wire rod as seen along the axis of the stator.

FIG. 11 is a perspective view of the bent wire rod 51. FIG. 12A is a partial side view of the bent wire rod 51 seen from a direction orthogonal to the axis R, and FIG. 12B is a plan view of the bent wire rod 51 seen along the axis R. FIG. 11 illustrates a bent wire rod 51 not compressingly deformed, whereas FIG. 12 illustrates a bent wire rod 51 compressingly deformed between the cover 5 and the stator 13.

The bent wire rod 51 is preferably defined by a single wire rod. The wire rod preferably has a circular or substantially circular cross-section. The wire rod is preferably made of a metal such as stainless steel. Examples of the wire rod include round steel, around wire rod, a steel wire, and a round bar. The bent wire rod 51 is shaped by bending the wire rod as described above. Consequently, the bent wire rod 51 is composed of a portion of bending the wire rod and/or a portion of extending the wire rod linearly.

Reference is made to FIG. 12A. The bent wire rod 51 includes projections 53a and depressions 53b arranged alternately and successively, the projections 53a being bent to project upward along the axis R and the depressions 53b being bent to project downward along the axis R. Consequently, when seen in the peripheral direction Q around the axis R, the bent wire rod 51 preferably has a zigzag or a wavy shape. The projections 53a and depressions 53b are preferably arranged at regular or substantially regular intervals.

Reference is made to FIG. 12B. The projections 53a and the depressions 53b are also bent such that the bent wire rod 51 has a polygonal or substantially polygonal outer shape with the projections 53a and the depressions 53b defining vertices when seen along the axis R. FIGS. 11 and 12B clearly illustrate the projections 53a surrounded by dashed line circles and the depressions 53b surrounded by dashed line triangles. As a result, the projections 53a and the depressions 53b according to a preferred embodiment of the present invention also correspond to corners of the bent wire rod 51.

A straight portion 55 is arranged between an adjacent projection 53a and depression 53b. The bent wire rod 51 includes ends 57a and 57b. Accordingly, the bent wire rod 51 has a polygonal or substantially polygonal shape including a portion partially opened when seen along the axis R. FIG. 12B illustrates the bent wire rod 51 shaped to be equilateral icositetragon when seen along the axis R. With the open portion, the total number of the projections 53a and the depressions 53b defining vertices is preferably twenty-three, for example.

The bent wire rod 51 having the above shape is compressingly deformable along the axis R. When compressingly deformed along the axis R, the bent wire rod 51 extends along the axis R to exert an elastic force to cause the bent wire rod 51 to return to its original shape.

As described above, the bent wire rod 51 has a polygonal or substantially polygonal outer shape with only the projections 53a and depressions 53b defining vertices, and no portion other than the projections 53a and depressions 53b defining a vertex. Consequently, the bent wire rod 51 has essentially a uniform shape regardless of whether it is upside-down. Accordingly, a portion projecting in one direction along the axis R may serve as a projection 53a or a depression 53b. This reduces the work load of assembling the bent wire rod 51.

The bent wire rod 51 has an opened portion at the ends 57a and 57b, and thus is compressingly deformable inwardly and radially relative to the axis R so as to have a smaller outer shape. When compressingly deformed radially and inwardly, the bent wire rod 51 generates an elastic force causing the bent wire rod 51 to expand radially and outwardly to cause the bent wire rod 51 to return to its original shape.

The bent wire rod 51 is made in advance to have a polygonal shape having a larger dimension than the external diameter of the stator 13 when seen along the axis R. This allows the bent wire rod 51 to contact the peripheral edge 38a of the stator 13. In a preferred embodiment of the present invention, the bent wire rod 51 is made in advance to have a polygonal shape having a dimension larger than the internal diameter of the side wall 41.

The stator 13 is fixed by the bent wire rod 51 as described below. Specifically, as illustrated in FIG. 10, the bent wire rod 51 is disposed along the side wall 41 of the cover 5 while being compressed to have a smaller outer shape. This causes the bent wire rod 51 to generate a radially outward elastic force by which the bent wire rod 51 expands across the entire periphery of the side wall 41. Then the bent wire rod 51 itself rests on the side wall 41 so as not to disconnect from the cover 5 under its own weight.

The cover 5 on which the bent wire rod 51 rests is fastened to the housing 3. Consequently, as illustrated in FIGS. 6 and 7, the bent wire rod 51 (depressions 53b) contacts the peripheral edge 38a of the stator core 31. The bent wire rod 51 (projections 53a) contacts the protrusion 45 along the side wall 41. Then the bent wire rod 51 is compressingly deformable along the axis R. The compressingly deformed bent wire rod 51 exerts an elastic force along the axis R. The protrusion 45 receives an elastic force upward along the axis R generated by the bent wire rod 51. The stator 13 receives an elastic force downward along the axis R generated by the bent wire rod 51. More specifically, the stator core 31 receives an elastic force distributed by all of the depressions 53b. As a result, the lower surface of the stator core 31 is pressed against the flange 24 of the tubular section 11 thus preventing or reducing the shifting of the stator 13 along the axis R.

As described above, the stator 13 is fixed by merely attaching the bent wire rod 51 to the cover 5 and coupling the cover 5 to the housing 3. Coupling the cover 5 to the housing 3 allows the bent wire rod 51 to be compressingly deformed in one operation in a given position to fix the stator 13 to the housing 3. This fixes the location of the stator 13 in a short period of time with high efficiency.

Moreover, the bent wire rod 51 is elasticity deformable. Consequently, variations in the dimension of the stator 13 or the cover 5 along the axis R are compensated for so as to suitably press the stator 13 against the tubular section 11.

With the combination of fixing the location of the stator 13 by the spring pin 15 described above and fixing the location of the stator 13 by the bent wire rod 51, the driving unit 1 according to a preferred embodiment of the present invention ensures prevention or significant reduction of the shifting of the stator 13 along the axis R.

Both the ends 57a and 57b of the bent wire rod 51 are designed not to project beyond the projections 53a and depressions 53b along the axis R when the bent wire rod 51 is compressingly deformed along the axis R as described above. Specifically, as illustrated in FIG. 12A, assuming that an area between the projections 53a and the depressions 53b along the axis R is an area G, the ends 57a and 57b are always located within the area G. For instance, it is preferable that a distance from the end 57a to the projection 53a or the depression 53b nearest to the end 57a is shorter than the length of a straight portion 55 between an adjacent projection 53a and depression 53b. It is more preferable that this distance is about one third the length of the straight portion 55, for example.

The bent wire rod 51 prevents the ends 57a and 57b thereof from contacting the top surface 38 of the stator core 31 and the protrusion 45 of the cover 5. Consequently, this prevents or reduces variations in the elastic force of the bent wire rod 51 along the axis R.

In addition, the ends 57a and 57b of the bent wire rod 51 do not contact each other when the bent wire rod 51 is compressingly deformed radially as described above. Consequently, the elastic force of the bent wire rod 51 can be prevented from varying along the axis R and/or radially. If the ends 57a and 57b contact each other, a property of the bent wire rod 51 as an elastic body (a relationship between load and an elastic force) varies.

Moreover, the protrusion 45 is inclined downwardly along the axis R radially and inwardly. Consequently, the bent wire rod 51 is not able to move radially and inwardly unless the bent wire rod 51 itself is further contracted. The protrusion 45 suitably prevents or reduces radial shifting of the contact position of the bent wire rod 51 and the cover 5. In other words, radial and inward shifting of the projections 53a of the bent wire rod 51 is suitably prevented or reduced.

Moreover, the collar 36 of the insulated bobbin 35 has a dimension slightly smaller than the external diameter of the stator core 31, and thus the top surface 38 of the stator core 31 (peripheral edge 38a) is exposed. This causes the bent wire rod 51 to directly contact the top surface 38 of the stator core 31, which has a relatively high rigidity. Consequently, the bent wire rod 51 allows the elastic force to act on the stator 13 directly allowing the stator 13 to stably receive the elastic force.

As clearly illustrated in FIG. 6, the collar 36 extends adjacent to the outer peripheral edge 39 of the stator core 31. Accordingly, the collar 36 suitably prevents or reduces radial shifting of the contact position of the bent wire rod 51 to the stator 13. In other words, the collar 36 suitably prevents or reduces shifting of the depressions 53b of the bent wire rod 51. In addition, the collar 36 is integrated with the insulated bobbin 35 simplifying the structure.

Moreover, the bent wire rod 51 is defined by a wire rod, and is thus suitably disposed within a narrow and annular area, such as the peripheral edge 38a of the stator 13. Accordingly, a reduction in the size of the stator 13 and the cover 5 is achieved. In addition, the bent wire rod 51 is formed preferably by bending the wire rod, and thus does not require a mold such as press dies resulting in low production costs.

The bent wire rod 51 preferably has an outer shape of a polygon including many vertices as seen along the axis R. Accordingly, the bent wire rod 51 suitably extends along the circumferential surface of the side wall 41. Moreover, many depressions 53b of the bent wire rod 51 lead to a decreased pressing by a single depression 53b against the stator 13. In addition, the elastic force is distributed along the stator 13.

The spring pin 15 does not project above the stator 13, thus preventing interference between the spring pin 15 and the bent wire rod 51.

The side wall 41 has an internal diameter slightly larger than the external diameter of the stator 13, and thus the stator 13 (stator core 31) projecting from the tubular section 11 is accommodated inside the side wall 41. As described above, the upper portion of the stator 13 is partially accommodated inside the cover 5 facilitating a reduction in the size of the driving unit 1.

Figure 13:
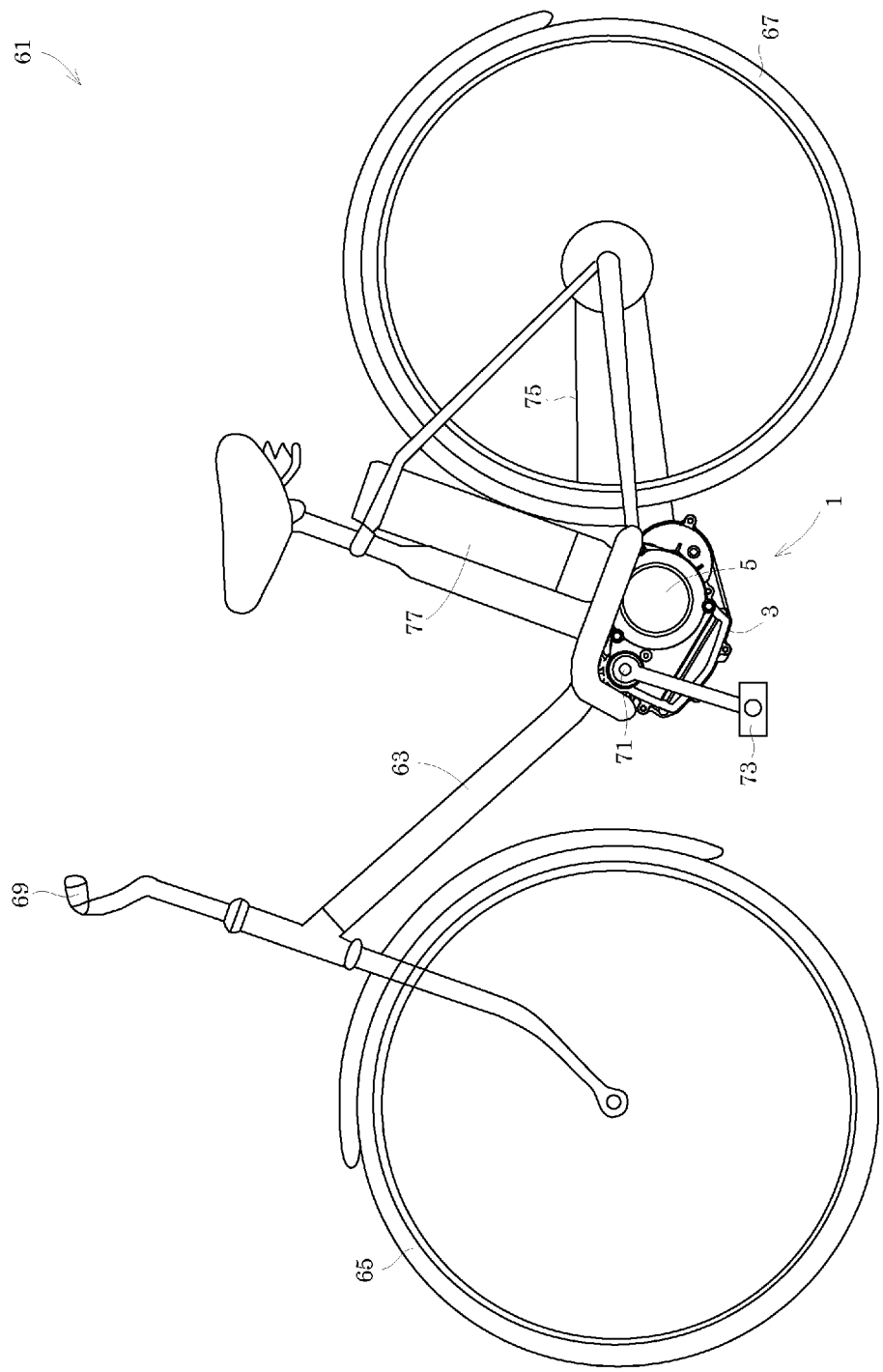
FIG. 13 is a left side view of a bicycle including the driving unit mounted thereon.

Description will be given next of an exemplary application of the driving unit 1 to a bicycle, for example, according to a preferred embodiment of the present invention. FIG. 13 is a left side view of a bicycle 61 with the driving unit 1 mounted thereon. The bicycle 61 includes a body frame 63, a front wheel 65 and a rear wheel 67 rotatably supported on the body frame 63, and a handle 69 supported on the body frame 63 to steer the front wheel 65.

The driving unit 1 is preferably supported on the body frame 63 around the lower middle portion of the bicycle 61. The driving unit 1 is provided such that the axis R is horizontal or substantially horizontal. The driving unit 1 includes a crankshaft 71 passing therethrough substantially horizontally. The crankshaft 71 includes pedals 73 coupled thereto on both ends thereof. Pressure on the pedals 73 causes the crankshaft 71 to rotate. Rotary power of the crankshaft 71 is transmitted to the rear wheel 67 via a chain 75. In addition, the body frame 63 includes a battery 77 supported thereon. The battery 77 drives the motor 18 defined by the stator 13 and the like.

Reference is now made to FIG. 3. The crankshaft 71 is inserted into the crankshaft chamber 72 of the driving unit 1. The crankshaft chamber 72 also includes a torque sensor (not shown) that detects torque of the crankshaft 71, and a controller (not shown) that controls the motor 18. Power from the motor 18 is output to an output shaft 20. Rotary power from the output shaft 20 is transmitted to the rear wheel 67 via the chain 75.

The controller controls the motor 18 in accordance with detection results from the torque sensor. The motor 18 generates auxiliary power in accordance with the pressure on the pedals 73. The pressure on the pedals 73 and the power from the motor 18 are transmitted to the chain 75 via the crankshaft 71 and the output shaft 20, respectively. The chain 75 combines the pressure on the pedals 73 and the power from the motor 18 to transmit the combined pressure and power to the rear wheel 67. This causes the bicycle 61 to move.

In the bicycle 61, the pedals 73 often contact the ground first. The pedals 73 are coupled to the crankshaft 71. Accordingly, the surface of the driving unit (the outer surface of the housing) of the bicycle 61 may undergo shock directly, or the interior of the driving unit (crank chamber) may undergo shock directly through the crankshaft. When shock is directly transmitted inside of the driving unit, a strong force is transmitted to the stator along the axis R. On the other hand, in the driving unit 1 according to a preferred embodiment of the present invention, the fixed structure of the stator 13 described above is used. This suitably prevents or reduces shifting of the stator 13 along the axis R. Consequently, the driving unit 1 according to a preferred embodiment of the present invention is suitable for mounting on the bicycle 61.

The present invention is not limited to the above preferred embodiments, but may be modified as described below.

The preferred embodiments described above both fix the stator 13 by the bent wire rod 51 and by the spring pin 15. However, this is not limitative. Specifically, the spring pin 15 may be omitted.

In the preferred embodiments described above, the shape of the bent wire rod 51 seen along the axis R preferably is an equilateral icositetragon as one example, but the present invention is not limited to this. That is, the number of vertices of the polygon may be selected and varied as appropriate. For instance, the polygon may be duodecagonal or more. In addition, the shape is not limited to be an equilateral polygon, but may be a polygon other than this. Alternatively, the shape may be modified into a circle, an ellipse or the like.

In the preferred embodiments described above, the bent wire rod 51 has a polygonal or substantially polygonal shape seen along the axis R with the projections 53a and the depressions 53b only defining the vertices. However, this is not limitative. For instance, assuming that a portion corresponding to the vertex of the polygon is a corner, the corner may be provided besides the projections 53a and the depressions 53b independently of the projections 53a and the depressions 53. In other words, the corners may be disposed in a position different from positions of the projections 53a and the depressions 53b. Alternatively, a projection 53a and a depression 53 may partially serve as the corner. In this case, a corner may also be provided besides the projections 53a and the depressions 53.

In addition, one of the projections 53a and depressions 53b may serve as a corner, and the other does not serve as a corner. Such a modification may be used. For instance, each of the corners is provided together with the projection 53a and not with the depression 53b. In this case, when the bent wire rod 51 is seen along the axis R, the depression 53b is disposed between the adjacent vertices (corners) of the polygon (i.e., around the center of each side of the polygon).

In the preferred embodiments described above, the bent wire rod 51 generates an elastic force radially and outwardly. However, this is not limitative. Specifically, the bent wire rod may be modified as appropriate that generates no elastic force radially and outwardly.

In the preferred embodiments described above, the bent wire rod 51 is defined by a wire rod having a circular cross-section, but is not limited to this. For instance, the bent wire rod may be modified to be defined by a wire rod having a rectangular or substantially rectangular cross-section.

In the preferred embodiments described above, the bent wire rod 51 rests on the cover 5 (side wall 41), but is not limited to this. For instance, the bent wire rod 51 may be modified to rest on the tubular section 11. Alternatively, the bent wire rod 51 may rest on the stator 13.

In the preferred embodiments described above, the contact position of the bent wire rod 51 and the stator 13 is at the peripheral edge 38a of the stator core 31. However, this is not limitative. The contact position may be modified to be another position of the stator core 31. In addition, the bent wire rod 51 may be modified to contact an element of the stator 13 other than the stator core 31 (e.g., the insulated bobbin 35 or the coil 37).

In the preferred embodiments described above, the protrusion 45 preferably is inclined, but is not limited to this. Specifically, the protrusion 45 may project in a horizontal direction radially and inwardly relative to the axis R.

In the preferred embodiments described above, the collar 36 restricting radial and inward shifting of the bent wire rod 51 is integrated with the insulated bobbin 35. However, this is not limitative. Specifically, a restricting element restricting radial and inward shifting of the bent wire rod 51 may be provided besides the insulated bobbin 35.

The preferred embodiments described above suggest that the driving unit 1 may be mounted to a bicycle, but the present invention is not limited to this. Alternatively, the driving unit 1 may be mounted to any vehicle or device. Accordingly, the crankshaft chamber 72 may be omitted with the modification above.

In the preferred embodiments described above, the stator 13 has been described as one example of an element of the motor 18, but the present invention is not limited to this. For instance, preferred embodiments of the present invention may be applicable to the stator 13 defining a generator.

The preferred embodiments and modifications described above may be modified as appropriate. For instance, each construction may be modified as appropriate by replacing or combining it with other modifications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stator-fixed structure comprising:
   a stator;
   a housing including a tubular section to accommodate the stator;
   a cover coupled to the housing to block an upper opening of the tubular section; and
   a bent wire rod defined by a wire to press the stator against the tubular section, the bent wire rod being in contact with a top surface of the stator and a rear surface of the cover while being compressingly deformed along an axis of the stator; wherein
   the bent wire rod has a substantially annular shape with an opened portion when seen along the axis, and includes projections projecting upward along the axis and depressions projecting downward along the axis arranged alternately and successively, the projections contacting the rear surface of the cover and the depressions contacting the top surface of the stator;
   the cover includes:
     a side wall provided on the rear surface of the cover along a peripheral direction about the axis, and contacting the bent wire rod to receive an elastic force radially and outwardly relative to the axis that is generated by the bent wire rod; wherein
   the side wall includes a protrusion unitary with the side wall and projecting from the side wall radially and inwardly relative to the axis to contact the projections and receive an upward elastic force along the axis that is generated by the bent wire rod;
   the protrusion is inclined downwardly and radially toward the axis; and
   a recess into which the projections are held is provided between the protrusion and the side wall.

2. The stator-fixed structure according to claim 1, wherein the bent wire rod includes a plurality of corners and a plurality of straight portions to define a substantially polygonal shape when seen along the axis, the straight portions connecting adjacent corners to each other.

3. The stator-fixed structure according to claim 2, wherein the corners are located at the projections or the depressions.

4. The stator-fixed structure according to claim 1, wherein the projections and the depressions are bent such that the bent wire rod has a substantially polygonal outer shape with the projections and the depressions defining vertices when seen along the axis, and the bent wire rod includes straight portions connecting adjacent projections and depressions.

5. The stator-fixed structure according to claim 1, wherein the bent wire rod is shaped to have a dimension larger than an external diameter of the stator when seen along the axis, and when assembled is being deformed so as to have a smaller outer shape than the external diameter of the stator.

6. The stator-fixed structure according to claim 1, wherein the bent wire rod is defined by a wire rod having a circular cross-section.

7. The stator-fixed structure according to claim 1, wherein the side wall has an internal diameter larger than an external diameter of the stator.

8. The stator-fixed structure according to claim 1, wherein the stator includes a stator core and coils formed by winding the stator core with a winding, and the bent wire rod directly contacts a top surface of the stator core.

9. The stator-fixed structure according to claim 8, wherein the stator further includes a restricting element disposed on the top surface of the stator core and inside from an outer peripheral edge of the stator core to restricting shifting of the bent wire rod radially inward.

10. The stator-fixed structure according to claim 9, wherein the stator further includes an insulated bobbin disposed between the stator core and the coils to cover the stator core, and the restricting element is integrated with the insulated bobbin.

11. A driving unit comprising:
   a motor configured to generate power, the motor including a rotor and a stator outside of the rotor;
   a housing including a tubular section accommodating the motor;
   a cover coupled to the housing to block an upper opening of the tubular section; and
   a bent wire rod defined by a wire rod, the bent wire rod being in contact with a top surface of the stator and a rear surface of the cover while being compressingly deformed along an axis of the stator to press the stator against the tubular section; wherein
   the bent wire rod is substantially annular and includes an opened portion when seen along the axis, and projections projecting upward along the axis and depressions projecting downward along the axis arranged alternately and successively;
   the projections contact the rear surface of the cover;
   the depressions contact the top surface of the stator;
   the cover includes:
     a side wall provided on the rear surface of the cover along a peripheral direction about the axis, and contacting the bent wire rod to receive an elastic force radially and outwardly relative to the axis that is generated by the bent wire rod; wherein
   the side wall includes a protrusion unitary with the side wall and projecting from the side wall radially and inwardly relative to the axis to contact the projections and receive an upward elastic force along the axis that is generated by the bent wire rod;
   the protrusion is inclined downwardly and radially toward the axis; and
   a recess into which the projections are held is provided between the protrusion and the side wall.

12. The driving unit according to claim 11, wherein the driving unit is mounted on a bicycle, the housing further includes a crankshaft chamber into which a crankshaft of the bicycle is inserted, and the motor generates power to assist pressure on pedals coupled to the crankshaft.

\* \* \* \* \*